United States Patent
Eager et al.

(10) Patent No.: US 11,028,751 B2
(45) Date of Patent: Jun. 8, 2021

(54) METHOD OF CONTROLLING OPERATION OF AN EXHAUST GAS TREATMENT APPARATUS

(71) Applicant: Caterpillar Inc., Deerfield, IL (US)

(72) Inventors: Antony J. Eager, Peterborough (GB); Ben Darley, Lincolnshire (GB)

(73) Assignee: Caterpillar Inc., Peoria, IL (US)

( * ) Notice: Subject to any disclaimer, the term of this patent is extended or adjusted under 35 U.S.C. 154(b) by 192 days.

(21) Appl. No.: 16/303,335

(22) PCT Filed: Apr. 25, 2017

(86) PCT No.: PCT/US2017/029273
§ 371 (c)(1),
(2) Date: Nov. 20, 2018

(87) PCT Pub. No.: WO2017/200720
PCT Pub. Date: Nov. 23, 2017

(65) Prior Publication Data
US 2020/0318515 A1  Oct. 8, 2020

(30) Foreign Application Priority Data
May 20, 2016 (GB) ...................................... 1608924

(51) Int. Cl.
*F01N 3/20* (2006.01)
*F01L 3/02* (2006.01)
(Continued)

(52) U.S. Cl.
CPC .............. *F01N 3/2066* (2013.01); *F01L 3/02* (2013.01); *F01N 3/021* (2013.01); *F01N 3/103* (2013.01);
(Continued)

(58) Field of Classification Search
CPC combination set(s) only.
See application file for complete search history.

(56) References Cited

U.S. PATENT DOCUMENTS 5,207,058 A   5/1993  Sasaki et al.
5,655,365 A   8/1997  Worth et al.
(Continued)

FOREIGN PATENT DOCUMENTS

CN   101371015   2/2009
CN   102121412   7/2011
(Continued)

OTHER PUBLICATIONS

International Search Report for related International Application No. PCT/US20171029273; report dated Jul. 14, 2017.
(Continued)

*Primary Examiner* — Binh Q Tran

(57) ABSTRACT

A method of controlling operation of an engine, the engine comprising: a combustion unit having an exhaust conduit and one or more combustion cylinders each having a piston, a fuel injector, an intake valve and an exhaust valve leading to the exhaust conduit; an exhaust gas treatment apparatus configured to receive fluid from the exhaust conduit and comprising a diesel oxidation catalyst module; and a controller configured to receive a temperature data value indicative of a temperature of gas within the diesel oxidation catalyst module. The method comprises: injecting fuel from the fuel injector into each of the one or more combustion cylinders in a main injection event to initiate via compression ignition a primary combustion event that drives the piston. The method further comprises using the controller to compare the temperature data value relative to a first temperature threshold value and a second temperature threshold value.

18 Claims, 3 Drawing Sheets

Injection windows for low speed and/or low load a = period available for main combustion injection
b = period available for late combustion injection
c = period available for non-combustion injection Timing relative to top dead centre

(51) Int. Cl.
*F01N 3/021* (2006.01)
*F01N 3/10* (2006.01)
*F02D 41/02* (2006.01)
*F02D 41/40* (2006.01)
*F02D 41/38* (2006.01)

(52) U.S. Cl.
CPC ....... *F02D 41/0245* (2013.01); *F02D 41/402* (2013.01); *F01L 2301/02* (2020.05); *F01N 2610/02* (2013.01); *F02D 2041/389* (2013.01); *F02D 2200/0802* (2013.01)

(56) References Cited

U.S. PATENT DOCUMENTS

| | | | | |
|---|---|---|---|---|
| 8,752,364 | B2* | 6/2014 | Guo | F02D 9/04 60/286 |
| 2002/0152744 | A1* | 10/2002 | Kawatani | F02D 41/029 60/286 |
| 2008/0104945 | A1 | 5/2008 | Ruth et al. | |
| 2010/0024392 | A1 | 2/2010 | Mueller et al. | |
| 2011/0146246 | A1 | 6/2011 | Farman et al. | |
| 2013/0008416 | A1* | 1/2013 | Nagatsu | F02D 41/0245 123/568.11 |
| 2013/0097999 | A1 | 4/2013 | Bouvier et al. | |
| 2014/0019028 | A1* | 1/2014 | Yacoub | F02D 41/0082 701/103 |
| 2015/0090020 | A1* | 4/2015 | Takita | F01N 11/002 73/114.75 |
| 2015/0275723 | A1* | 10/2015 | Koch | F02D 41/029 60/605.2 |
| 2016/0108825 | A1 | 4/2016 | Rumpsa | |
| 2018/0111087 | A1* | 4/2018 | Nakada | F02D 41/027 |

FOREIGN PATENT DOCUMENTS

| | | |
|---|---|---|
| CN | 105526011 | 4/2016 |
| EP | 1026494 A1 | 8/2000 |
| EP | 1384879 A2 | 1/2004 |
| EP | 1496236 A2 | 1/2005 |
| EP | 1978219 A1 | 10/2008 |
| EP | 2927449 A1 | 10/2015 |

OTHER PUBLICATIONS

United Kingdom Search Report for related GB Application No. 1608924.5; dated Jan. 9, 2017.

* cited by examiner

METHOD OF CONTROLLING OPERATION OF AN EXHAUST GAS TREATMENT APPARATUS

CROSS-REFERENCE TO RELATED APPLICATION

This Application is a 35 USC § 371 US National Stage filing of International Application No. PCT/US2017/029273 filed on Apr. 25, 2017 which claims priority under the Paris Convention to United Kingdom Patent Application No. 1608924.5 filed on May 20, 2016.

TECHNICAL FIELD

The disclosure relates to the field of exhaust gas treatment and, in particular, to controlling operation of an exhaust gas treatment apparatus having a diesel oxidation catalyst.

BACKGROUND

An exhaust gas treatment apparatus may comprise a plurality of modules, wherein each module is intended to treat one or more constituents of an exhaust gas. The modules may be arranged in series such that exhaust gas flows through each module in sequence. In order to operate as intended, some modules may require the exhaust gas to exceed a particular temperature.

An exhaust gas treatment apparatus may comprise a diesel oxidation catalyst module, a diesel particulate filter module downstream of the diesel oxidation catalyst module and a selective catalytic reduction module, downstream of the diesel particulate filter module. One or more of these modules may not operate as intended when the exhaust gas is below a certain temperature. Moreover, increased temperature may improve operation and efficiency of the exhaust gas treatment apparatus.

In order to increase the temperature of the exhaust gas, it is known to use the diesel oxidation catalyst module to increase the temperature of the exhaust gas passing through it in order to increase the temperature of exhaust gas arriving downstream of the diesel oxidation catalyst. This may be achieved by introducing unburnt fuel upstream of the diesel oxidation catalyst for oxidation in the diesel oxidation catalyst thereby to increase the temperature of the exhaust gas leaving the diesel oxidation catalyst module.

Accordingly, in addition to injection of fuel for combustion, fuel may be injected into one or more of the cylinders as a post combustion event with the intention that the fuel passes out of the one or more cylinders without oxidising. This fuel may oxidise in the diesel oxidation catalyst module and thereby increase temperature of exhaust gas therein.

There may be one or more reasons why it may be desirable to increase temperature of exhaust gas in the exhaust gas treatment apparatus. These reasons may include: burning deposits of urea that may otherwise build on interior surfaces of the exhaust gas treatment apparatus; burning deposits of soot that may accumulate on the diesel particulate filter and also increasing the temperature of exhaust gas arriving at the selective catalytic reduction module which may increase efficiency and reliability of operation.

There may be a minimum temperature at which fuel will ignite in the diesel oxidation catalyst module, which may be referred to as a diesel oxidation catalyst combustion threshold temperature. Fuel injected upstream of the diesel oxidation catalyst module that does not combust in the diesel oxidation catalyst module may be released as unburnt fuel from the exhaust gas treatment apparatus. This is undesirable for reasons including regulatory requirements, environmental considerations and reduced efficiency. In recognition of this, it is known to avoid injecting fuel for combustion in the diesel oxidation catalyst module until such time as the threshold temperature has been reached.

SUMMARY OF THE DISCLOSURE

Against this background there is provided a method of controlling operation of an engine, the engine comprising:

a combustion unit having an exhaust conduit and one or more combustion cylinders each having a piston, a fuel injector, an intake valve and an exhaust valve leading to the exhaust conduit;

an exhaust gas treatment apparatus configured to receive fluid from the exhaust conduit and comprising an upstream module and a downstream module;

a controller configured to receive a temperature data value indicative of a temperature of gas within the upstream module;

the method comprising:

injecting fuel from the fuel injector into each of the one or more combustion cylinders in a main injection event to initiate a primary combustion event that drives the piston; and using the controller to compare the temperature data value relative to a first temperature threshold value and a second temperature threshold value; wherein:

in an event that the controller determines that the temperature data value is between the first threshold temperature value and the second threshold temperature value, injecting fuel from the fuel injector into one of the one or more combustion cylinders in a subsidiary injection event after the main injection event during a period in which the fuel injected in the subsidiary injection event passes into the upstream module without combusting in the combustion unit; and in an event that the controller determines that the temperature data value is below the first threshold temperature value, injecting fuel from the fuel injector into one of the one or more combustion cylinders in an interim injection event during a period after the main injection event such that fuel injected in the interim injection event results in a secondary combustion event in the combustion unit.

DETAILED DESCRIPTION

The disclosure relates to a method of controlling an engine having an exhaust gas treatment apparatus.

For understanding the context of the method of the disclosure, there follows a description of a possible exhaust gas treatment apparatus of an engine that may be controlled by the method. As the skilled person would readily understand, the method of the disclosure is applicable to a wide range of exhaust gas treatment apparatus and is not limited to the specific example described below, which is provided simply for assisting the reader in understanding the context of the method of the disclosure.

Figure 4:
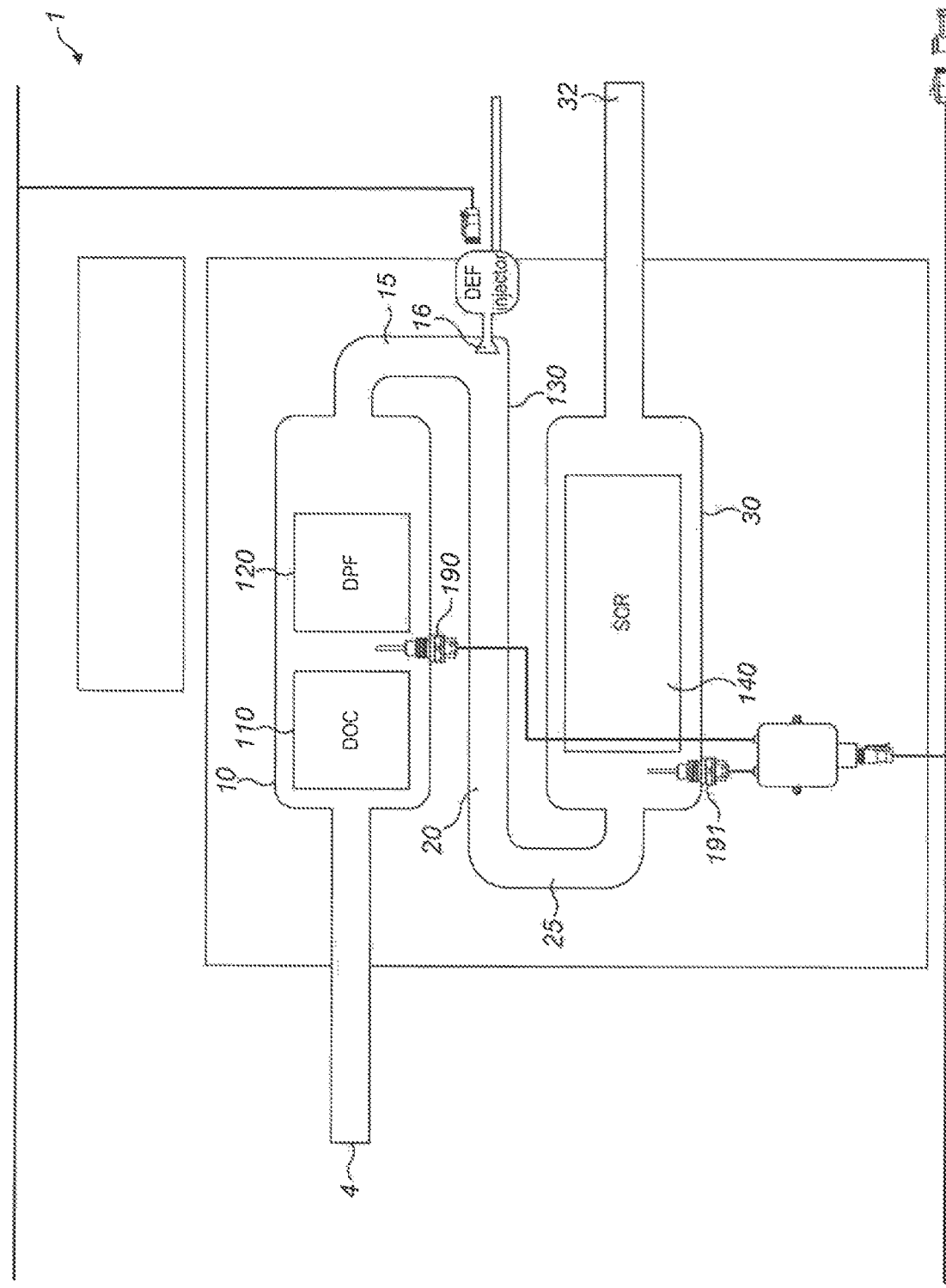
FIG. 4 shows an exhaust gas treatment apparatus of an engine that may be controlled by the method of the present disclosure.

FIG. 4 shows a schematic representation of an exhaust gas treatment apparatus 1 of an engine that may be controlled by the method of the disclosure. The exhaust gas treatment apparatus 1 may comprise a fluid flow path through which fluid may flow sequentially through various conduits, such as a first conduit 10, a first end coupling 15, a second conduit 20, a second end coupling 25, and a third conduit 30. The first, second and third conduits 10, 20, 30 may be substantially mutually parallel.

The fluid flow path may comprise, in series, a diesel oxidation catalyst (DOC) module 110, a diesel particulate filter (DPF) module 120, a mixer module 130, a selective catalytic reduction (SCR) module 140 and/or an ammonia oxidation catalyst (AMOX) module 150.

In use, fluid may be supplied to the exhaust gas treatment apparatus 1 via the inlet 4. Fluid may pass into the DOC module 110 in the first portion of the first conduit 10. Prior to receipt at the inlet 4, the temperature of exhaust may be sensed by a temperature sensor (not shown).

Temperature of exhaust gas within the DOC module 110 may be derived by a temperature sensor in the vicinity of the DOC module 110 (not shown). Alternatively, it may be inferred from temperatures obtained from one or more sensors that may be upstream and/or downstream of the DOC module 110. Alternatively, it may be inferred based on other sensed data in combination with one or more calculations and or the use of one or more data libraries. In the example exhaust gas treatment apparatus of FIG. 4, for example, temperature sensors 190, 191 may be located downstream of the diesel oxidation catalyst module as well as upstream of the exhaust gas treatment apparatus (not shown). From data obtained from these sensors, temperature of gas within the diesel oxidation catalyst module may be inferred. In other embodiments, a single temperature sensor may be provided within the DOC module 110. Factors that may influence the presence, number and location of temperature sensors may include other control requirements of the engine and the exhaust gas treatment apparatus that fall outside the scope of this disclosure.

The DOC module 110 may comprise one or more catalysts, such as palladium or platinum. These materials serve as catalysts to cause oxidation of hydrocarbons ([HC]) and carbon monoxide (CO) present in the fluid flow in order to produce carbon dioxide ($CO_2$) and water ($H_2O$). The DOC module 110 may also serve to convert NO to $NO_2$ so as to achieve a $NO:NO_2$ ratio of 1:1. The catalysts may be distributed in a manner so as to maximise the surface area of catalyst material in order to increase effectiveness of the catalyst in catalysing reactions.

Fluid may flow from the DOC module 110 to the DPF module 120 which comprises features which are intended to restrict onward passage of carbon (C) in the form of soot. Carbon particles in the fluid may thus be trapped in the filter. The DPF module 120 may be regenerated through known regeneration techniques. These techniques may involve controlling one or more of the temperature of the fluid, the pressure of the fluid and the proportion of unburnt fuel in the fluid at this point in the apparatus.

Exhaust gas may pass from the DPF module 120 into the first end coupling 15 where it flows past the emissions fluid injector module 16. The emissions fluid injector module 16 may be associated with or attachable to a pump electronic tank unit (PETU). The pump electronic tank unit may comprise a tank for providing a reservoir for emissions fluid to be injected by the emissions fluid injector module 16. Such emissions fluids may include urea or ammonia.

The PETU may further comprise a controller configured to control a volume of emissions fluid to be injected from the tank by the emissions fluid injector module 16. The controller may have as inputs, for example, temperature information and quantity of $NO_x$ information which may be derived from sensors in the SCR module 140.

Emissions fluid (e.g. urea, ammonia) may pass from the emissions fluid injector module 16 into the mixer module (not shown) located in the second conduit 20. The mixer module may comprise features for ensuring that the exhaust gas originating from the first conduit 10 is well mixed with the emissions fluid originating from the emissions fluid injector module 16, to create a mixed fluid.

The mixed fluid from the second conduit 20 may pass into the SCR module located in the first portion of the third conduit via the second end coupling 25. The SCR module 140 may comprise one or more catalysts through which the mixed fluid may flow. As the mixed fluid passes over the surfaces of the catalyst, a reaction may occur that converts the ammonia and $NO_x$ to diatomic nitrogen ($N_2$) and water ($H_2O$).

Fluid may pass from the SCR module 140 to the AMOX module 150 located in the second portion of the third conduit 30. The AMOX module 150 may comprise an oxidation catalyst which may cause residual ammonia present in the fluid exiting the SCR module to react to produce nitrogen ($N_2$) and water ($H_2O$).

Fluid may pass from the AMOX module 150 to the exhaust gas treatment apparatus outlet located at the second end 32 of the third conduit 30.

For each chemical reaction or process that is to take place in the exhaust gas treatment apparatus, there may be a desired minimum temperature.

For example, in order for the relevant chemical reactions to take place in the SCR module 140, the temperature of exhaust gas reaching the SCR module 140 may need to be above a threshold, which might be referred to as the SCR threshold temperature. If the temperature of exhaust gas reaching the SCR module 140 is below the SCR threshold temperature then the desired chemical reactions may not take place such that ammonia may pass directly out of the exhaust gas treatment apparatus 1 which not only misses the benefits derivable from the SCR module 140 but also results in ammonia being passed out to atmosphere which is undesirable and wasteful. Accordingly, there may be a period (for example when the engine is first in use, before it has warmed up) in which the temperature of the exhaust gas reaching the SCR module 140 is too low for the SCR module 140 to be employed.

In a further example, the temperature of exhaust gas reaching the DPF module 120 may need to be above a threshold, which might be referred to as the DPF threshold temperature, in order effectively to combust soot that may collect within the DPF module 120. Accordingly, there may be a period in which the temperature of the exhaust gas reaching the DPF module 120 is insufficient to facilitate the combustion of soot deposits from the DPF module 120.

In a still further example, the temperature of exhaust has reaching the mixer module 130 may need to be above a threshold in order effectively to combust solid urea deposits that may develop in the vicinity of the emissions fluid injector module 16. Accordingly, there may be a period in which the temperature of the exhaust reaching the mixer module 130 is insufficient to facilitate the decomposition of urea deposits that may develop in the vicinity of the emissions fluid injector module 16.

The SCR threshold temperature, the DPF threshold temperature and a threshold temperature for the decomposition of urea deposits are all examples of a threshold temperature downstream of the DOC module. Conversely, the threshold temperature downstream of the DOC module may be calculated or selected from one or more of the thresholds or from other criteria.

As the skilled person will appreciate, other elements of the exhaust gas treatment apparatus (and indeed exhaust gas treatment apparatus having different modules) may have associated temperature thresholds. The method of the disclosure is not limited to any one temperature threshold for any one particular process in any one particular component of any one particular exhaust gas treatment apparatus.

In order to increase a temperature of exhaust gas in the exhaust gas treatment apparatus to seek to meet or exceed the threshold temperature downstream of the DOC module, it is known to burn fuel in the DOC module 110 for the purpose of increasing exhaust gas temperature. While it is possible to inject fuel for this purpose directly into the DOC module 110, it is also possible to avoid the need for a separate injector by employing the fuel injector already present in the combustion cylinder(s) of the engine. This may involve injection of fuel for combustion in the DOC module 110 by injecting it into the combustion cylinder(s) of the engine at a time in the combustion cycle (e.g. during an exhaust stroke of the cylinder) when conditions are such that the fuel will pass directly through the cylinder without burning and therefore be available for combustion within the DOC module 110.

In order for combustion of this fuel to take place in the DOC module 110, the temperature of exhaust gas (with the unburnt fuel contained therein) arriving at the DOC module 110 may need to exceed a threshold temperature, referred to herein as the DOC threshold temperature. If the temperature of exhaust gas reaching the DOC module 110 is below the DOC threshold temperature then the fuel may not combust and may pass directly out of the exhaust gas treatment apparatus 1 which not only negates the purpose of injecting this fuel (thus increasing fuel consumption for no benefit) but also results in fuel being passed out to atmosphere which is also undesirable.

Accordingly, there is a desire to bring exhaust gas of an engine to a desired temperature more rapidly.

An engine to which the method may be applied may comprise a combustion unit having an exhaust conduit and one or more combustion cylinders. Each of the one or more cylinders may comprise a piston, a fuel injector, an intake valve and an exhaust valve leading to the exhaust conduit. Fuel may be injected into the (or each) combustion cylinder via the fuel injector. The fuel injector may be configured to inject fuel in accordance with a controlled timing pattern.

The method of the present disclosure may involve injecting fuel into a combustion cylinder of the engine at a point in the combustion cycle that is between the regular injection (when the fuel combusts during the combustion stroke of the cylinder) and a late injection (when the fuel passes downstream to the DOC module 110 for combustion). In this way, the method of the present disclosure may involve injecting fuel into the combustion cylinder of the engine at a point when: either it will combust in the cylinder but towards the end of or after the combustion stroke; or it will combust shortly downstream of the cylinder, such as within an exhaust gas manifold of the engine and upstream of the exhaust gas treatment apparatus 1. In this way, the fuel injected at this intermediate injection can be efficiently converted directly into heat of the exhaust gas which in turn reduces the period of time taken for the exhaust gas to reach the DOC threshold temperature.

Accordingly, the present disclosure relates to controlling an internal combustion engine having an exhaust gas treatment apparatus 1 involving three different in-cylinder injection types.

Figure 1:
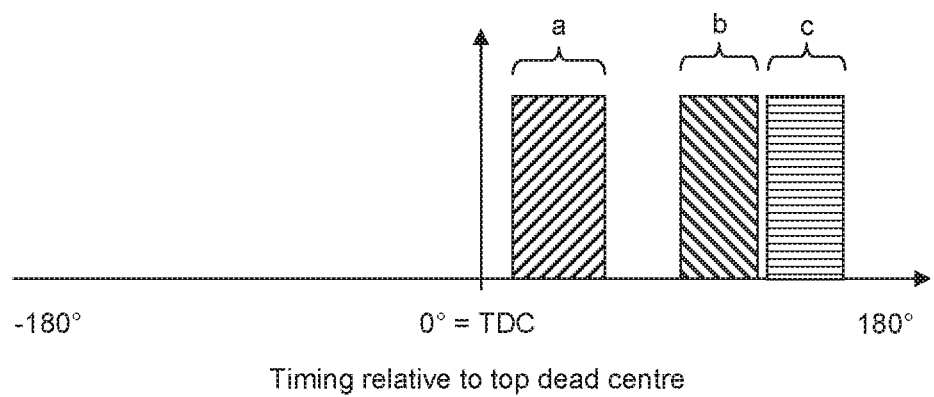
FIG. 1 shows a timing diagram illustrating example timing windows for injection of fuel in an engine relative to top dead centre of the piston in the case of a low speed and/or low load scenario.

Referring to FIG. 1, there is illustrated a highly schematic timing diagram showing the relationship between the three different periods available for the three different in-cylinder injection types. The x-axis represents timing relative to top dead centre position of the piston at the start of the combustion stroke. The y-axis is simply a binary indication of whether or not a particular injection window is open.

The period available for main combustion injection is labelled (a), the period available for injection of fluid for combustion in the DOC module is labelled (c) and the period available for the intermediate injection that results in combustion in or shortly downstream of the cylinder at the end of or shortly after the combustion stroke is labelled (b).

Fuel may be injected for main combustion in the main combustion window labelled (a) regardless of the temperature of the exhaust gas. Fuel for combustion in the DOC module injected during the injection window labelled (b) may be injected if the temperature of exhaust gas in the DOC is such that the fuel injected during period (b) will combust in the DOC module—that is to say the temperature of exhaust gas in the DOC exceeds the DOC threshold temperature. Fuel injected during injection window (c) for combustion in or shortly downstream of the cylinder may be injected even if the temperature of exhaust gas at the DOC is below the DOC threshold temperature.

As the skilled person is readily aware, the timing of injection for a main combustion event is influenced by a range of factors, including engine speed and load. Accordingly, for high speed and/or high load conditions, the timing of the injection for main combustion is brought forward relative to top dead centre piston position.

FIG. 2 shows, again in a highly schematic fashion, how the timings may be brought forward in high speed and/or high load conditions. For the avoidance of doubt, FIGS. 1 and 2 may relate to one and the same engine with different operation dependent upon speed and load. As the skilled person is aware, a wide range of factors may influence injection timing and an engine controller may provide for a very wide range of possible injection timings.

Figure 2:
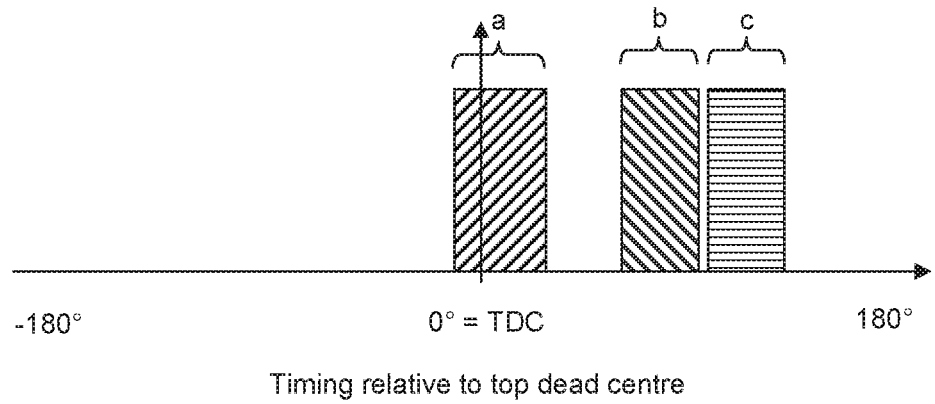
FIG. 2 shows a timing diagram illustrating example timing windows for injection of fuel in the same engine as FIG. 1 relative to top dead centre of the piston in the case of a high speed and/or high load scenario.

It should be noted that each of the periods labelled (a), (b) and (c) in FIGS. 1 and 2 do not necessarily indicate an injection occurring throughout the period. These periods are simply the windows available for injection of the relevant kind. Furthermore, each window may involve one or more than one injection within the window. Where there are multiple injections within a window, these may be distributed across some or all of the injection window, with a distribution that may be even or uneven in terms of timing and/or volume. Furthermore, the volume of fuel injected in each window may vary dependent upon conditions and desired outputs.

Since the timing of the main injection event window (labelled (a)) depends upon operating conditions such as speed and load, the timing of injection windows (b) and (c) may also change.

Figure 3:
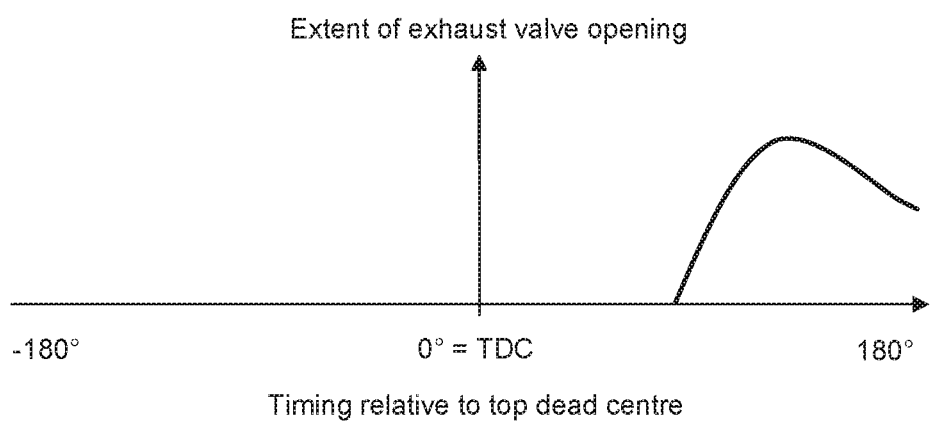
FIG. 3 shows a timing diagram illustrating extent of exhaust valve opening relative to top dead centre of the piston, regardless of engine speed and load.

Referring to FIG. 3, there is shown a schematic timing representation showing when the exhaust valve may open relative to top dead centre piston position. As would be understood by the skilled person, exhaust valve opening relative to top dead centre piston position (and therefore relative to pressure in the cylinder) may contribute to conditions within the cylinder and to whether or not fuel injected in a particular timing window may combust and, if so, whether that combustion is likely to contribute to power output from the engine or not.

While the method may be applied to a four-stroke engine having intake, compression, combustion and exhaust strokes, it may also be possible to apply the method to a two-stroke engine.

Furthermore, the method may be applied to an engine having any number of cylinders. Where an engine to which the method is applied comprises a plurality of cylinders, while the main combustion injection event (that takes place during injection window (a)) may be applied to every one of the plurality of cylinders, it may be the case that the other injection events (that take place during injection windows (b) and (c)) are not carried out for all of the plurality of cylinders. For example, non-combustion injection events (that take place in injection window (c)) may take place only on a first subset of the plurality of cylinders and the intermediate injection events (that take place in injection window (b)) may take place only on a second subset of the plurality of cylinders. The first and second subsets may be entirely the same, entirely different or may have some degree of overlap without being entirely the same.

Furthermore, which and how many cylinders of the plurality of cylinders belong to the first and second subsets may change dependent upon other parameters including (but not limited to) magnitude and speed of desired temperature increase, engine speed, engine load and time.

It may be the case that the intermediate injection events (that take place in injection window (b)) give rise to an increase in temperature of gas in close proximity to the exhaust valve and/or an exhaust valve seat of the exhaust valve. Ceramic valves and or valve seats may be appropriate for withstanding these increased temperatures.

Timing of the intermediate injection event (that takes place in injection window (b)) may be such that the pressure within the cylinder and/or the temperature of gas within the cylinder and/or other conditions within the cylinder means that combustion of the fuel injected during the intermediate injection events does not always occur spontaneously. Where that is or may be the case, it may be necessary or desirable to provide a spark plug or glow plug within the cylinder or downstream of the cylinder in the exhaust conduit to initiate combustion of this fuel and an appropriate time following its injection. In the case of a spark ignition engine, one or more existing spark plugs or glow plugs may be used for this purpose. In the case of a compression ignition engine, one or more existing spark plugs or glow plugs may be used for this purpose or one or more spark plugs or glow plugs may be provided specifically for igniting the fuel injected during the intermediate injection event.

The terms exhaust gas and exhaust fluid may be used interchangeably. The exhaust gas/fluid may include some liquid, especially solid particles such as particles of soot which, while in the solid phase, may be understood to be a constituent of exhaust gas/fluid.

INDUSTRIAL APPLICABILITY

The method may be applicable to an internal combustion engine having an exhaust gas treatment apparatus for bringing elements of the exhaust gas treatment apparatus to temperature more rapidly. The exhaust gas treatment apparatus may comprise any number of a variety of different elements, one, some or all of which may require a specific minimum temperature for reliable operation. The engine may be a spark or compression ignition engine, may be a two-stroke or a four-stroke engine, and may have one or a plurality of combustion cylinders. The method may enable an engine to exceed emission regulation requirements.

The invention claimed is:

1. A method of controlling operation of an engine, the engine comprising:
a combustion unit having an exhaust conduit and one or more combustion cylinders each having a piston, a fuel injector, an intake valve and an exhaust valve leading to the exhaust conduit;
an exhaust gas treatment apparatus configured to receive fluid from the exhaust conduit and comprising an upstream module and a downstream module;
a controller configured to receive a temperature data value indicative of a temperature of gas within the upstream module;
the method comprising:
injecting fuel from the fuel injector into each of the one or more combustion cylinders in a main injection event to initiate a primary combustion event that drives the piston; and
using the controller to compare the temperature data value relative to a first temperature threshold value and a second temperature threshold value; wherein:
in an event that the controller determines that the temperature data value is between the first threshold temperature value and the second threshold temperature value, injecting fuel from the fuel injector into one of the one or more combustion cylinders in a subsidiary injection event after the main injection event during a period in which the fuel injected in the subsidiary injection event passes into the upstream module without combusting in the combustion unit; and
in an event that the controller determines that the temperature data value is below the first threshold temperature value, injecting fuel from the fuel injector into one of the one or more combustion cylinders in an interim injection event during a period after the main injection event such that fuel injected in the interim injection event results in a secondary combustion event in the combustion unit.

2. The method of claim 1 comprising combustion of the fuel injected in the subsidiary injection event in the upstream module of the exhaust gas treatment apparatus.

3. The method of claim 1 wherein the upstream module of the exhaust gas treatment apparatus comprises a diesel oxidation catalyst.

4. The method of claim 3 wherein the first threshold temperature value corresponds to a minimum temperature at which fuel entering the diesel oxidation catalyst module combusts in the diesel oxidation catalyst module.

5. The method of claim 1 wherein the combustion unit comprises first and second combustion cylinders and wherein the method comprises: the subsidiary injection event comprising injecting fuel into the first combustion cylinder;

and the interim injection event comprises injecting fuel into the second combustion cylinder.

6. The method of claim 1 wherein the second temperature threshold value corresponds to a steady state temperature of the exhaust gas treatment apparatus.

7. The method of claim 1 wherein:
the exhaust gas treatment apparatus comprises a selective catalytic reduction module and wherein the second threshold temperature value corresponds to or is a function of a minimum prescribed temperature of operation of the selective catalytic reduction module.

8. The method of claim 1 wherein the engine further comprises a glow plug and wherein the method further comprises using the glow plug to ignite the fuel injected in the interim injection event.

9. The method of claim 1 wherein parts of the exhaust valve comprise ceramic.

10. The method of claim 1 further comprising providing a temperature sensor in a vicinity of the diesel oxidation catalyst configured to provide the temperature data value indicative of the temperature of gas within the diesel oxidation catalyst module.

11. The method of claim 1 further comprising:
using the controller to receive sensed temperature data from upstream of or downstream of the diesel oxidation catalyst module and use said sensed temperature data to calculate an inferred temperature data value that is indicative of the temperature of gas within the diesel oxidation catalyst module.

12. An engine comprising:
a combustion unit having an exhaust conduit and one or more combustion cylinders each having a piston, a fuel injector, an intake valve and an exhaust valve leading to the exhaust conduit;
an exhaust gas treatment apparatus configured to receive fluid from the exhaust conduit and comprising an upstream module and a downstream module;
a controller configured to receive a temperature data value indicative of a temperature of gas within the upstream module;
wherein the controlled is configured to:
initiate injection of fuel from the fuel injector into each of the one or more combustion cylinders in a main injection event to initiate a primary combustion event that drives the piston; and
compare the temperature data value relative to a first temperature threshold value and a second temperature threshold value; wherein:

in an event that the controller determines that the temperature data value is between the first threshold temperature value and the second threshold temperature value, to initiate injection of fuel from the fuel injector into one of the one or more combustion cylinders in a subsidiary injection event after the main injection event during a period in which the fuel injected in the subsidiary injection event passes into the upstream module without combusting in the combustion unit; and in an event that the controller determines that the temperature data value is below the first threshold temperature value, to initiate injection of fuel from the fuel injector into one of the one or more combustion cylinders in an interim injection event during a period after the main injection event such that fuel injected in the interim injection event results in a secondary combustion event in the combustion unit.

13. The engine of claim 12 wherein the combustion unit comprises one or more glow plugs or spark plugs.

14. The engine of claim 12 wherein the exhaust valve comprises ceramic.

15. The engine of claim 12 further comprising a temperature sensor in a vicinity of the diesel oxidation catalyst configured to provide the temperature data value indicative of the temperature of gas within the diesel oxidation catalyst module.

16. The method of claim 1 wherein:
the exhaust gas treatment apparatus comprises a diesel particulate filter module and wherein the second threshold temperature value corresponds to or is a function of a minimum prescribed temperature for combustion of soot in the diesel particulate filter module.

17. The method of claim 1 wherein:
the exhaust gas treatment apparatus comprises emissions fluid injector module for injecting urea containing material and wherein the second threshold temperature value corresponds to or is a function of a minimum prescribed temperature for decomposition of urea deposits that may build up in the vicinity of the emissions fluid injector module.

18. The method of claim 1 further comprising:
using measured, inferred, or modelled data in combination with a look-up table or data library to establish the temperature data value that is indicative of the temperature of gas within the diesel oxidation catalyst module.

* * * * *